(12) United States Patent
Ashizawa

(10) Patent No.: US 8,786,163 B2
(45) Date of Patent: Jul. 22, 2014

(54) VIBRATIONAL WAVE MOTOR, LENS BARREL AND CAMERA

(75) Inventor: Takatoshi Ashizawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/310,167

(22) Filed: Dec. 2, 2011

(65) Prior Publication Data
US 2012/0139390 A1 Jun. 7, 2012

(30) Foreign Application Priority Data

Dec. 6, 2010 (JP) ................................. 2010-271272

(51) Int. Cl.
H02N 2/16 (2006.01)
(52) U.S. Cl.
CPC ..................... *H02N 2/163* (2013.01)
USPC .................................................... 310/323.09
(58) Field of Classification Search
CPC ....................................................... H02N 2/163
USPC ........................................ 310/323.02–323.09
See application file for complete search history.

(56) References Cited

U.S. PATENT DOCUMENTS

| | | | | |
|---|---|---|---|---|
| 6,744,176 | B2 * | 6/2004 | Dinger ..................... | 310/323.05 |
| 7,352,109 | B2 | 4/2008 | Ryu et al. | |
| 7,602,104 | B2 | 10/2009 | Sakamoto | |
| 7,696,670 | B2 * | 4/2010 | Sakamoto ................ | 310/323.09 |
| 7,932,660 | B2 * | 4/2011 | Hamamoto et al. ..... | 310/323.09 |
| 2001/0011859 | A1 * | 8/2001 | Yamanaka et al. ....... | 310/323.09 |
| 2006/0108895 | A1 | 5/2006 | Ryu et al. | |
| 2007/0036534 | A1 | 2/2007 | Sasaki | |
| 2008/0174206 | A1 | 7/2008 | Sakamoto | |
| 2009/0009029 | A1 | 1/2009 | Sakamoto | |

FOREIGN PATENT DOCUMENTS

| | | |
|---|---|---|
| JP | U-63-143095 | 9/1988 |
| JP | B2-1-17354 | 3/1989 |
| JP | A-06-225550 | 8/1994 |
| JP | A-11-196591 | 7/1999 |
| JP | A-2006-149180 | 6/2006 |
| JP | A-2006-333629 | 12/2006 |
| JP | A-2007-049879 | 2/2007 |
| JP | A-2008-178250 | 7/2008 |
| JP | A-2008-306907 | 12/2008 |
| JP | A-2009-017735 | 1/2009 |

OTHER PUBLICATIONS

May 7, 2013 Office Action issued in Japanese Patent Application No. 2010-271272 (with translation).
Dec. 17, 2013 Office Action issued in Japanese Patent Application No. 2010-271272.

\* cited by examiner

*Primary Examiner* — Jaydi San Martin
(74) *Attorney, Agent, or Firm* — Oliff PLC

(57) ABSTRACT

A vibrational wave motor includes a motor main body and pressing member. The motor main body includes an electromechanical conversion element, elastic body and relative motion member. The elastic body joined to the electromechanical conversion element generates an oscillating wave. The relative motion member in pressure contact with the elastic body is rotationally driven relative to the elastic body. The pressing member generates a pressing force between the elastic body and relative motion member. The pressing member includes a pressure applying portion, extension portion and pressing main body. The pressure applying portion presses one of the elastic body and the relative motion member towards the other, along a rotation axis. The extension portion extends outward from the pressure applying portion in a radial direction centered about the rotation axis. The pressing main body is disposed more outward in the radial direction than the motor main body at the extension portion.

10 Claims, 12 Drawing Sheets

VIBRATIONAL WAVE MOTOR, LENS BARREL AND CAMERA

This application is based on and claims the benefit of priority from Japanese Patent Application No. 2010-271272, filed on 6 Dec. 2010, the content of which is incorporated herein by reference.

BACKGROUND OF THE INVENTION

1. Field of the Invention

The present invention relates to a vibrational wave motor, a lens barrel and camera.

2. Related Art

In a vibrational wave motor, a progressive oscillating wave (hereinafter abbreviated as progressive wave) is generated at the driving face of an elastic body using the expansion and contraction of a piezoelectric body. Further, an elliptic motion arises at the driving face by the progressive wave, and a moving element in pressure contact with the wave crests of the elliptic movement is driven (for example, refer to Japanese Examined Patent Publication No. H1-17354).

Such a vibrational wave motor is characterized in having high torque even at low rotation rates, thus when mounted on a driving device, it is possible to reduce the number of gears of the driving device. Therefore, the noise generated by the gears can be reduced, and it is possible to achieve a reduction in sound, and further, the positioning accuracy can be improved.

In recent years, there has been a trend to lighten and miniaturize vibrational wave motors such that the diameter is about ⅓ to ⅕ of those of the prior art. Such a miniaturized vibrational wave motor, which has good ease of use for inclusion in machinery, has advanced applicability for a wide range of applications. Accordingly, the number being shipped is greatly increasing.

In such a vibrational wave motor, a pressure is applied such that a driving force is transmitted between the driving face of the elastic body and the sliding face of the moving element to which the driving force is transmitted from the driving face. In the prior art, this pressure force has been generated by a spring member into which an output shaft is inserted (for example, refer to Japanese Unexamined Patent Publication No. 2006-333629). Therefore, there had been limitations to the shortening of the length in a direction of the output shaft of the vibrational wave motor.

On the other hand, the constitution of a vibrational wave motor has been disclosed where, one part for generating a pressing force is disposed more radially outside than another part where an elastic body and a moving element are disposed, without the one part being disposed centered about an output shaft, (for example, refer to Japanese Unexamined Patent Publication No. H11-196591).

However, a pressing force generated in Japanese Unexamined Patent Publication No. H11-196591 is inclined and not parallel to the output shaft. Accordingly, it gives rise to drawbacks that since the pressing force between an oscillator and the moving element is offset, an unpleasant sound is generated at high rotation rates, the driving efficiency is reduced, and the generation of a high load is difficult, and the like.

SUMMARY OF THE INVENTION

The present invention has the objective of providing a vibrational wave motor which enables miniaturization and a uniform pressure, and a lens barrel and camera.

The present invention achieves the above objective by the following means. Further, in order to facilitate understanding, the present invention is explained with appended reference symbols corresponding to embodiments, but is in no way limited to this.

In an aspect of the present invention, a vibrational wave motor (1, 201, 301, 401, 501) is provided, which includes a motor main body (25, 225, 325, 425, 525) and a pressing member (30, 230, 330, 430, 530).

The motor main body includes an electromechanical conversion element (12, 212, 312, 512), an elastic body (13, 213, 313, 413, 513) and a relative motion member (11, 211, 311, 511). The electromechanical conversion element is configured to be excited by a driving signal. The elastic body is configured to be joined to the electromechanical conversion element and generate an oscillating wave by an excitation thereof. The relative motion member is configured to be in pressure contact with the elastic body and rotationally driven relatively with respect to the elastic body by the oscillating wave.

The pressing member is configured to generate a pressing force between the elastic body and the relative motion member. The pressing member includes a pressure applying portion (31, 231, 331, 431, 531) and an extension portion (32, 232, 332, 432A, 432B, 532A, 532B) and a pressing main body (33, 233, 333, 433A, 433B, 533A, 533B). The pressure applying portion is configured to press one of the elastic body and the relative motion member towards the other, along a rotation axis (C1) of rotational driving. The extension portion is configured to extend from the pressure applying portion towards an outer side in a radial direction centered about the rotation axis (C1). The pressing main body is disposed further to the outer side in the radial direction than the motor main body at the extension portion.

In a second aspect of the invention, a vibrational wave motor (1, 201, 301, 401, 501) according to the first aspect is provided, in which the pressing main body (33, 233, 333, 433A, 433B, 533A, 533B) and the motor main body (25, 225, 325, 425, 525) are disposed at one side of the extension portion (32, 232, 332, 432A, 432B, 532A, 532B) in a direction along the rotation axis (C1).

In a third aspect of the invention, a vibrational wave motor (1, 201, 301, 401, 501) according to the first aspect is provided, in which the pressure applying portion (31, 231, 331, 431, 531) presses one of the elastic body (13, 213, 313, 413, 513) and the relative motion member (11, 211, 311, 511) with the rotation axis (C1) as the center.

In a fourth aspect of the invention, a vibrational wave motor (1, 301, 401) according to the first aspect is provided, in which the pressing main body (33, 333, 433A, 433B) includes a pressed portion (34, 334, 434) configured to be continuous from the extension portion (32, 332, 432A, 432B) and pressed along an axis parallel to the rotation axis (C1).

In a fifth aspect of the invention, a vibrational wave motor (1, 301, 401) according to the fourth aspect is provided, in which the pressed portion (34, 334, 434) is configured to be pressed by a compression spring.

In a sixth aspect of the invention, a vibrational wave motor (301) according to the first aspect is provided, in which the pressure applying portion (331) is disposed along a circle centered about the rotation axis (C1).

In a seventh aspect of the invention, a vibrational wave motor (401, 501) according to the first aspect is provided, in which the extension portion (432A, 432B, 532A, 532B) is configured to extend in a plurality of radial directions from the pressure applying portion (431, 531), and the pressing main body (433A, 433B, 533A, 533B) is provided at respective ends of the extension portions (432A, 432B, 532A, 532B).

In an eighth aspect of the invention, a vibrational wave motor (501) according to the seventh aspect is provided, in which the plurality of radial directions of the extension portion (532A, 532B) is configured to extend along different diametrical directions.

In a ninth aspect of the invention, a vibrational wave motor (201, 501) according to the first aspect is provided, in which the extension portion (232, 532A, 532B) is a plate spring.

In a tenth aspect of the invention, a vibrational wave motor (201, 501) according to the ninth aspect is provided, in which the extension portion (232, 332, 532A, 532B) includes a first portion and a second portion, and an end at the outer side in the radial direction of the first portion is continuous with the second portion extending parallel to the rotation axis (C1), and a stiffness of the second portion is higher than a stiffness of the first portion.

In an eleventh aspect of the invention, a lens barrel (2) is provided, which is provided with a vibrational wave motor (1, 201, 301, 401, 501) according to any one of the first to tenth aspects of the invention.

In a twelfth aspect of the invention, a camera (3) is provided, which is provided with a vibrational wave motor (1, 201, 301, 401, 501) according to any one of the first to tenth aspects of the invention.

Further, the constitutions explained with the attached reference symbols may be suitably modified, or at least one part may be replaced with another constituent.

According to the present invention, it is possible to provide a vibrational wave motor which can be miniaturized and can apply a uniform pressure, and a lens barrel and a camera.

DETAILED DESCRIPTION OF THE INVENTION

First Embodiment

A first embodiment of a vibrational wave motor 1 of the present invention is explained in detail below with reference to the attached drawings.

Figure 1:
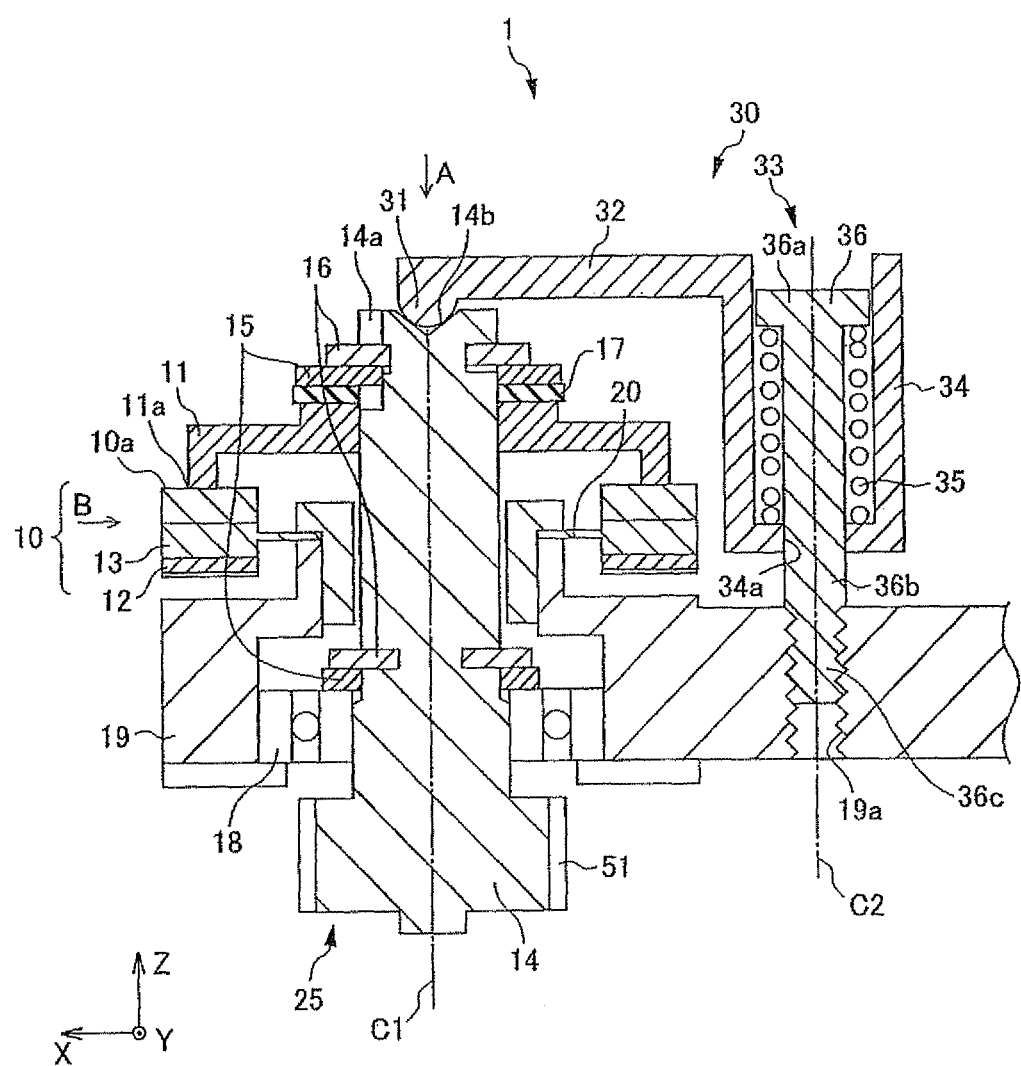
FIG. 1 is a drawing explaining a vibrational wave motor of a first embodiment of the present invention.
Figure 2:
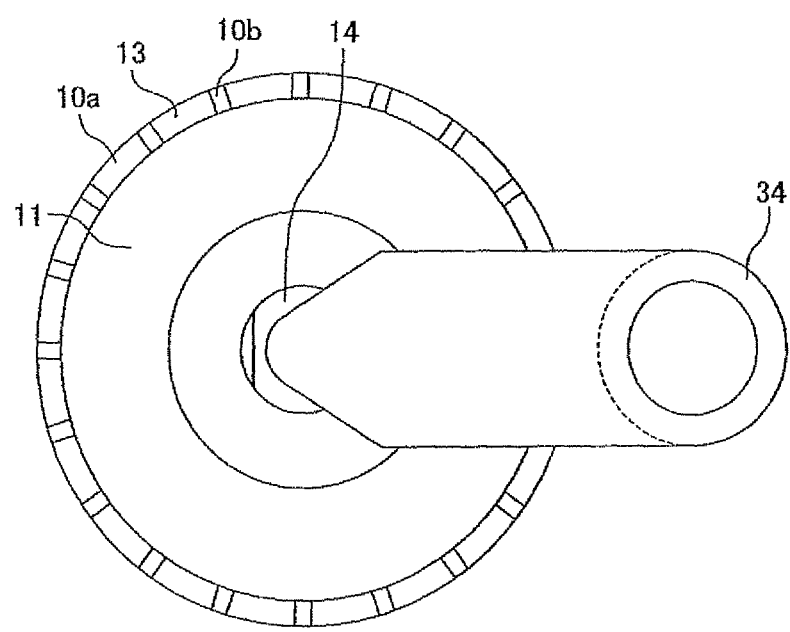
FIG. 2 is a drawing of the vibrational wave motor seen from a direction A of FIG. 1.
Figure 2:
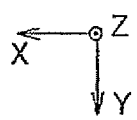

FIG. 1 is a drawing explaining the vibrational wave motor 1 according to the first embodiment of the present invention. FIG. 2 is a drawing of the vibrational wave motor 1 seen from a direction A of FIG. 1.

Further, an XYZ Cartesian coordinate system is provided in the drawings, for ease of explanation and understanding where suitable. In this coordinate system, as shown in FIG. 1, a direction of a shaft center C1 of an output shaft 14 of the vibrational wave motor 1 is set as a Z direction (a direction from an oscillator 10 to be described later towards a moving element 11 is a Z plus direction); a direction in which a later described pressure generating portion of the vibrational wave motor 1 is provided when seen from the shaft center C1 is set as an X minus direction; and a direction orthogonal to these is set as a Y direction. Further, in the following, the Z plus direction is referred to as an upper side, and a Z minus direction is referred to as a lower side.

As shown in FIG. 1, the vibrational wave motor 1 of the present embodiment is provided with a motor unit 25 having the oscillator 10, the moving element 11, an output shaft 14 and the like; and a pressing member 30. The vibrational wave motor 1 is configured such that the oscillator 10 is fixed and the moving element 11 is rotationally driven.

The oscillator 10 is constituted of an electrical-mechanical conversion element 12 (below referred to as piezoelectric body), for example a piezoelectric element or an electrostrictive element or the like which converts electrical energy into mechanical energy and an elastic body 13 which is joined to the piezoelectric body 12. A progressive oscillating wave is generated at the oscillator 10. In the present embodiment, as an example, a four-wave progressive wave is generated.

The elastic body 13 is composed of a metal with a high resonance acuity, and has a toroidal form. One face of the elastic body 13 is joined to the piezoelectric body 12. At the other face, grooves 10b (shown in FIG. 2) are cut, and portions other than the grooves 10b on this face form a driving face 10a (shown in FIG. 2), with which the moving element 11 is in pressure contact.

The piezoelectric body 12 may be constituted of a material such as lead zirconate titanate, called PZT, and further, in consideration of environmental problems, it may also be constituted of sodium potassium niobate, potassium niobate, sodium niobate, potassium barium titanate, bismuth sodium titanate, bismuth potassium titanate and the like, which are lead free materials.

Electrodes are disposed on the piezoelectric body 12, and these electrodes are divided into two phases (A phase and B phase) along a circumferential direction. In each phase at every ½ wavelength, the polarization alternates, and the electrodes are disposed such that between the A phase and the B phase, a ¼ wavelength interval is opened.

The moving element 11 is composed of a light metal such as aluminum alloy, and a surface treatment for improving the abrasion resistance is carried out on a surface of a sliding face 11a.

The output shaft 14 is joined to the moving element 11 via a stopper member 15 inserted such that it is fit into a rubber member 17 and a D cut 14a of the output shaft 14. The output shaft 14 and the stopper member 15 are fixed by an E-clip 16 or the like, and rotate integrally with the moving element 11. Accordingly, a shaft center of a rotation direction of the moving element 11 is approximately coaxial with the shaft center C1 of the output shaft 14.

Further, at an upper end face (an end face of the Z plus side) of the output shaft 14, an indented portion 14b is formed, having an inverted conical shape centered about the shaft center C1 of the output shaft 14.

The rubber member 17 between the stopper member 15 and the moving element 11 has the function of joining the moving element 11 and the stopper member 15 by the adhesiveness of the rubber member 17, and further it is favorable to use a butyl rubber member or the like which has the function of vibration absorption such that the vibrations from the moving member 11 are not transmitted to the output shaft 14.

Further, a bearing 18 is fit at an outer periphery of the output shaft 14, and is fixed to the output shaft 14 by the E-clip 16 and the stopper member 15.

The combination of the above described oscillator 10, moving element 11, output shaft 14 and the like, disposed centered about the shaft center C1 of the output shaft 14, is referred to as a motor unit 25.

Further, the vibrational wave motor 1 is provided with a base plate 19 fixed to a gear unit module 50 (shown in FIG. 3) which is a fixed portion of a lens barrel 2 described later. A fin portion 20 provided diametrically inside the elastic body 13 at the oscillator 10, is fixed to a base plate 19. Further, the base plate 19, which supports the bearing 18 fit at the output shaft 14 in a radial direction, supports the output shaft 14 movably in a direction of rotation.

The pressing member 30 is a member which presses the sliding face 11a of the moving element 11 towards the driving face 10a of the elastic body 13.

The pressing member 30 is provided with a pressure applying portion 31 disposed in contact with an inner face of the indented portion 14b provided at the output shaft 14, an extension portion 32 extending outward from the pressure applying portion 31 in the radial direction centered about the shaft center C1 of the output shaft 14, and a pressure generating portion 33 provided at an end of the extension portion 32.

The pressure applying portion 31 has a hemispherical form. Because the indented portion 14b of the output shaft 14 which contacts the pressure applying portion 31 has an inverted conical form, the pressure applying portion 31 and the indented portion 14b of the output shaft 14 come in secure contact with each other (line contact).

The extension portion 32 is a plate shaped member extending outward from the pressure applying portion 31 in the radial direction centered about the shaft center C1 of the output shaft 14.

The pressure generating portion 33 is provided at an outward end of the extension portion 32 in the radial direction, placed below (the Z minus side) the extension portion 32.

The pressure generating portion 33 is provided with a cylinder portion 34 shaped like a closed end cylinder, and a pin 36 disposed at an inner portion of the cylinder portion 34 and having a tip which protrudes beyond a hole portion 34a provided at the closed end of the cylinder portion 34.

The pin 36 is provided with a head portion 36a and a columnar portion 36b which extends from the head portion 36a. Further, at the end of the columnar portion 36b a screw portion 36c is formed.

At the base plate 19, a screw hole 19a is formed, with which the screw portion 36c of the pin 36 is screw-engaged. Here, the screw hole 19a is formed parallel to the shaft center C1 of the output shaft 14. Accordingly, a shaft center C2 of the pin 36, the screw portion 36c of which engages with the screw hole 19a, becomes parallel to the shaft center C1 of the output shaft 14.

A compression spring 35 is attached to an outer periphery of the columnar portion 36b of the pin 36. One end of the compression spring 35 contacts the closed end (Z plus side face) of the cylinder portion 34, and the other end contacts a lower face (Z minus side face) of the head portion 36a of the pin 36.

By screwing the screw portion 36c of the pin 36 into the screw hole 19a provided at the base plate 19, and by adjusting the screwing depth, it is possible to adjust the position of the head portion 36a of the pin 36 with respect to the base plate 19. By adjusting the position of the head portion 36a of the pin 36 with respect to the base plate 19, it is possible to adjust a pressing force applied by the compression spring 35 to the cylinder portion 34 at its lower end. The pressing force exerted by the compression spring 35 on the cylinder portion 34 is transmitted to the pressure applying portion 31 via the extension portion 32. Accordingly, the pressing force exerted by the pressure applying portion 31 on the output shaft 14 is adjusted.

Here, an outer periphery of the head portion 36a of the pin 36 slidably contacts an inner face of the cylinder 34. Further, an outer periphery of the columnar portion 36b of the pin 36 slidably contacts an inner face of the hole portion 34a of the cylinder portion 34.

Accordingly, the cylinder portion 34 is guided at its inner face by the outer periphery of the head portion 36a, and the inner face of the hole portion 34a is guided by the columnar portion 36b. By this guidance, the cylinder 34 is moveable along the shaft center C2 of the pin 36.

The shaft center C2 of the pin 36 is parallel to the shaft center C1 of the output shaft 14 as described above. Accordingly, a moving direction of the cylinder portion 34 also becomes parallel to the shaft center C1 of the output shaft 14. Consequently, the pressure applying portion 31 provided at the end of the extension portion 32 extending from the cylinder portion 34 can apply a pressing force along the shaft center C1 of the output shaft 14.

Figure 3:
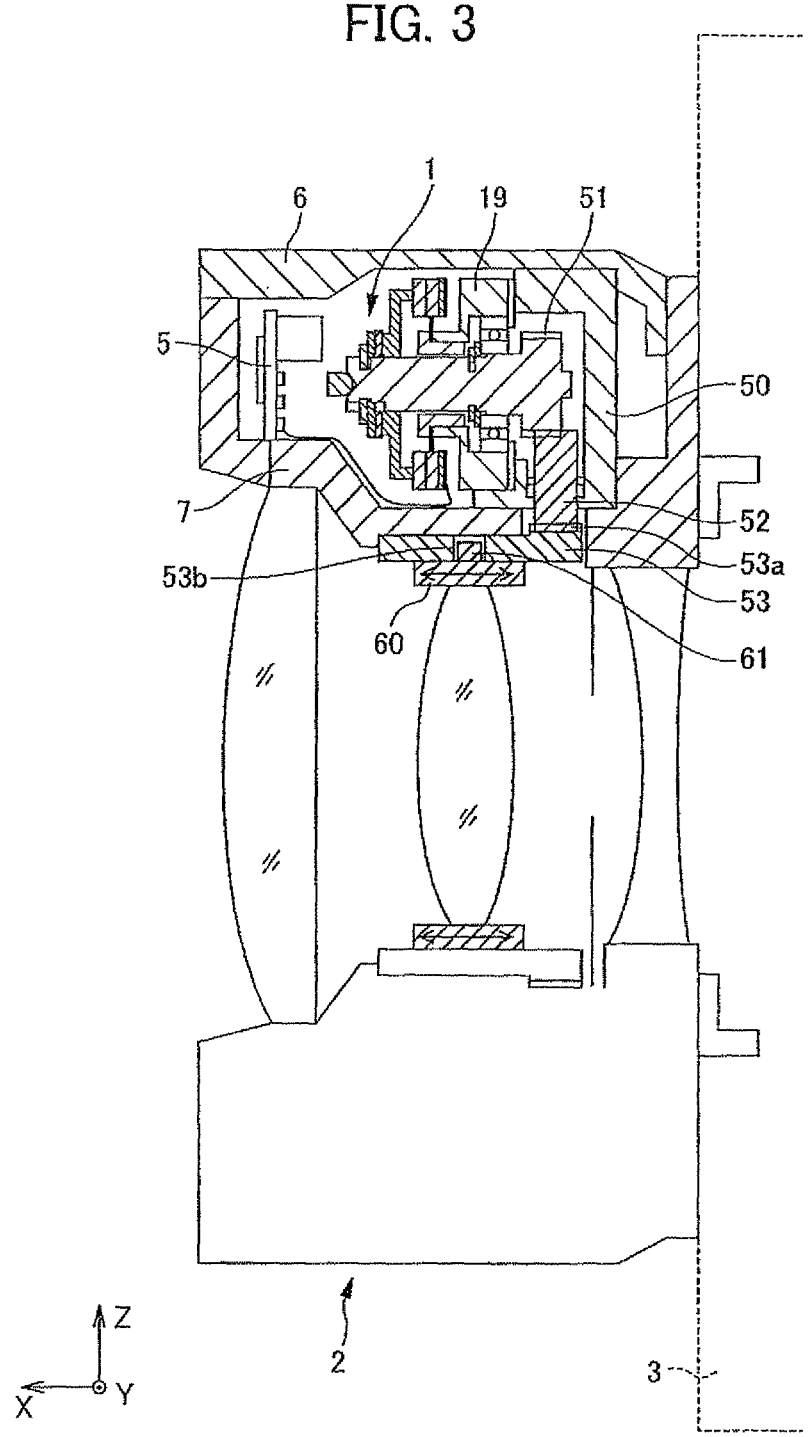
FIG. 3 is an outline cross sectional view of a camera provided with a lens barrel equipped with the vibrational wave motor of the first embodiment.

FIG. 3 is an outline cross sectional view of a camera 3 provided with a lens barrel 2 equipped with the vibrational wave motor 1 of the first embodiment. Further, the vibrational wave motor 1 of FIG. 3 is seen from a direction B shown in FIG. 1.

The base plate 19 on which the vibrational wave motor 1 is disposed is attached to the gear unit module 50 of the lens barrel 2. An output gear 51 of the vibrational wave motor 1 engages with a reduction gear 52 of the gear unit module 50, and the reduction gear 52 engages with a gear portion 53a formed at a cam ring 53.

A rotational driving force of the vibrational wave motor 1 is transmitted to the output gear 51, the reduction gear 52, and the gear portion 53a of the cam ring gear 53, and the cam ring 53 is rotationally driven.

A gear groove 53b which is oblique with respect to the circumferential direction is cut at the cam ring 53. An AF ring 60 with a fixing pin 61 which is inserted into the gear groove 53b is rectilinearly driven in an optical axis direction by the rotational driving of the cam ring 53 and made stoppable at a desired position.

Further, between an outer side fixed tube 6 and an inner side fixed tube 7 of the lens barrel 2, a lens driving circuit 5 is provided. The lens driving circuit 5 performs driving, control and rotation rate detection of the vibrational wave motor 1, and the reception of signals from a vibration sensor and the like.

Figure 4:
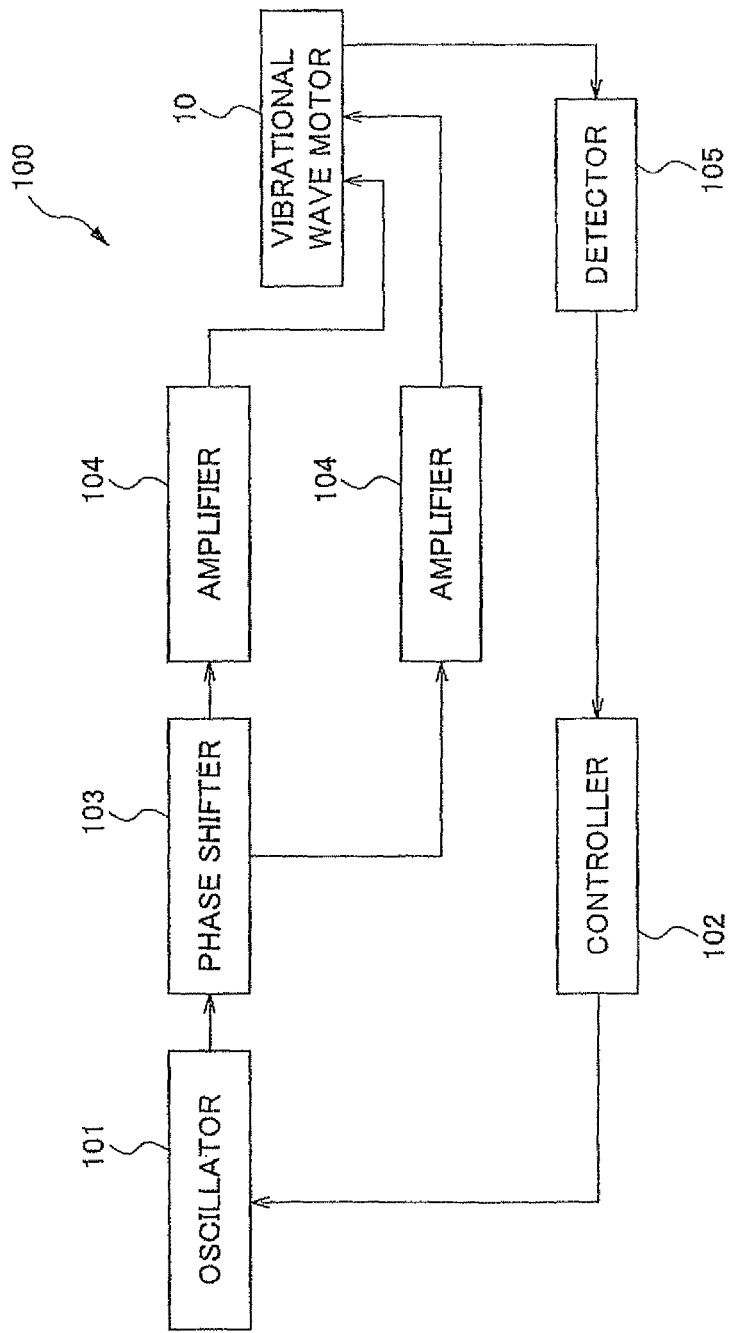
FIG. 4 is a block diagram of a driving device of a vibrational wave motor provided in a lens driving circuit.

FIG. 4 is a block diagram explaining a driving device 100 of the vibrational wave motor 1 provided in the lens driving circuit 5. The driving device 100 is provided with an oscillator 101, a controller 102, a phase shifter 103, and an amplifier 104.

The oscillator 101 generates a driving signal of the desired frequency according to an instruction of the controller 102. The phase shifter 103 separates the driving signal generated by the oscillator 101 into two driving signals having different phases. The amplifier 104 respectively boosts the two driving signals divided by the phase shifter 103 to the desired voltages.

The driving signal from the amplifier 104 is transmitted to the vibrational wave motor 1, and the application of this driving signal causes the oscillator 10 to generate a progressive wave, causing the moving element 11 to be driven. A rotation detector 105 is constituted of an optical encoder or a magnetic encoder or the like, and detects the position and speed of a driven object driven by the driving of the moving element 11, and transmits the detected values to the controller 102 as an electric signal. The controller 102 controls driving of the vibrational wave motor 1 based on a driving instruction from a CPU of the camera 3 or the lens barrel 2. The controller 102 receives a detection signal from the rotation detector 105, and obtains position information and speed information based on a value of the detection signal. Accordingly, the controller 102 controls the frequency of the oscillator 101 so as to perform positioning at a target position.

Next, the operation of the first embodiment of the vibrational wave motor 1 will be explained.

The controller 102 issues a driving command, causing the oscillator 101 to generate a driving signal. The phase shifter 103 divides this signal into two driving signals having a 90° phase difference. The amplifier 104 boosts these driving signals to the desired voltages. These boosted driving signals applied to the piezoelectric body 12 of the vibrational wave motor 1 causes the piezoelectric body 12 to be excited. As a result of the excitation, a fourth bending vibration is generated at the elastic body 13. The piezoelectric body is divided into an A phase and a B phase, and the driving signals are respectively applied to the A phase and the B phase. Positional phases of a fourth bending vibration generated from the A phase and a fourth bending vibration generated from the B phase have a ¼ wavelength difference, and further, the A phase driving signal and the B phase driving signal have a 90° phase difference, thus two bending vibrations combine to form a four-wave progressive wave.

Further, the wave number is not limited to 4, and may be 9, or 5, 6, 7, 8, 10 or more, and by controlling in the same way, with the same constitution, it is possible to obtain the same effects.

At wave crests of the progressive waves, an elliptic motion arises. Accordingly, the moving element 11 in pressure contact with the driving face 10a is frictionally driven by this elliptic motion. At a driven body driven by the driving of the moving element 11, an optical encoder is disposed. The optical encoder generates electric pulses, which is transmitted to the controller 102. The controller 102 can obtain the current position and current speed-based on the electric pulses.

Here, the pressing member 30 which presses the driving face 10a of the oscillator 10 is provided with the pressure applying portion 31, the extension portion 32, and the pressure generating portion 33, as described above. The cylinder portion 34 of the pressure generating portion 33 is applied a pressing force along the shaft center C2 which is parallel to the shaft center C1 of the output shaft 14. This pressing force is transmitted to the pressure applying portion 31 by the extension portion 32, and is applied to the center of the output shaft 14 by the pressure applying portion 31. Since the shaft center C2 of the pin 36 is in a direction parallel to the shaft center C1 of the output shaft 14, a direction in which the pressure applying portion 31 provided at the end of the extension portion 32 applies a pressing force is also substantially the same as a direction of the shaft center C1 of the output shaft 14.

Further, the pressure applying portion 31 has a spherical surface, and the shape of a portion of the output shaft 14 which contacts the pressure applying portion 31 is shaped like an inverted cone, thus it is possible to prevent the pressing force between the oscillator 10 and the moving element 11 from being offset, and it is possible to generate a uniform pressing force.

Figure 5:
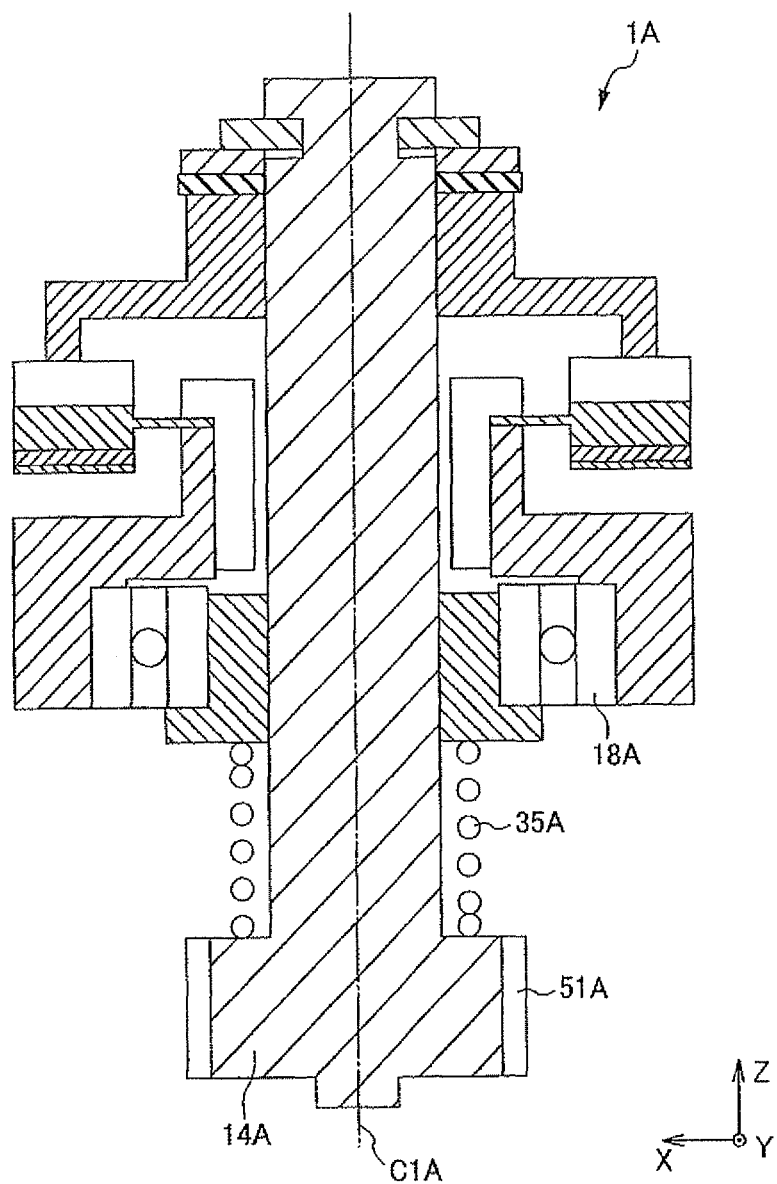
FIG. 5 is a drawing showing a comparative example with respect to the first embodiment.

FIG. 5 is a drawing showing a comparative form with respect to the present embodiment. The point of difference between this comparative embodiment and the first embodiment is that a pressing member (compression spring) 35A is provided between a gear portion 51A of an output shaft 14A and a bearing 18A. According to this comparative embodiment, the compression spring 35A is inserted at the output shaft 14A, thus requiring a length along a shaft center C1A of a vibrational wave motor 1A corresponding to the length of the compression spring 35A.

However, as shown in FIG. 1, the compression spring 35 according to the present embodiment is not attached to the output shaft 14 of the vibrational wave motor 1. Compared to the comparative embodiment, it is possible to reduce the length in the shaft center C1 direction of the vibrational wave motor 1 by the length of, the compression spring 35. Accordingly, it is possible to make the vibrational wave motor 1 in a flat form.

Further, in the present embodiment, the pressure generating portion 33 is provided at the lower side (Z minus side) of the extension portion 32. Accordingly, it is possible to minimize the length in the shaft center C1 direction of the vibrational wave motor 1. Since such a vibrational wave motor 1 of the present embodiment can be made to have a short length in the shaft center C1 direction, it can also be mounted in a so-called pancake type lens barrel as shown in FIG. 3.

Further, since the pressure generating portion 33 uses the compression spring 35 which stably works in the present embodiment, it is possible to apply a stable pressing force.

Second Embodiment

Figure 6:
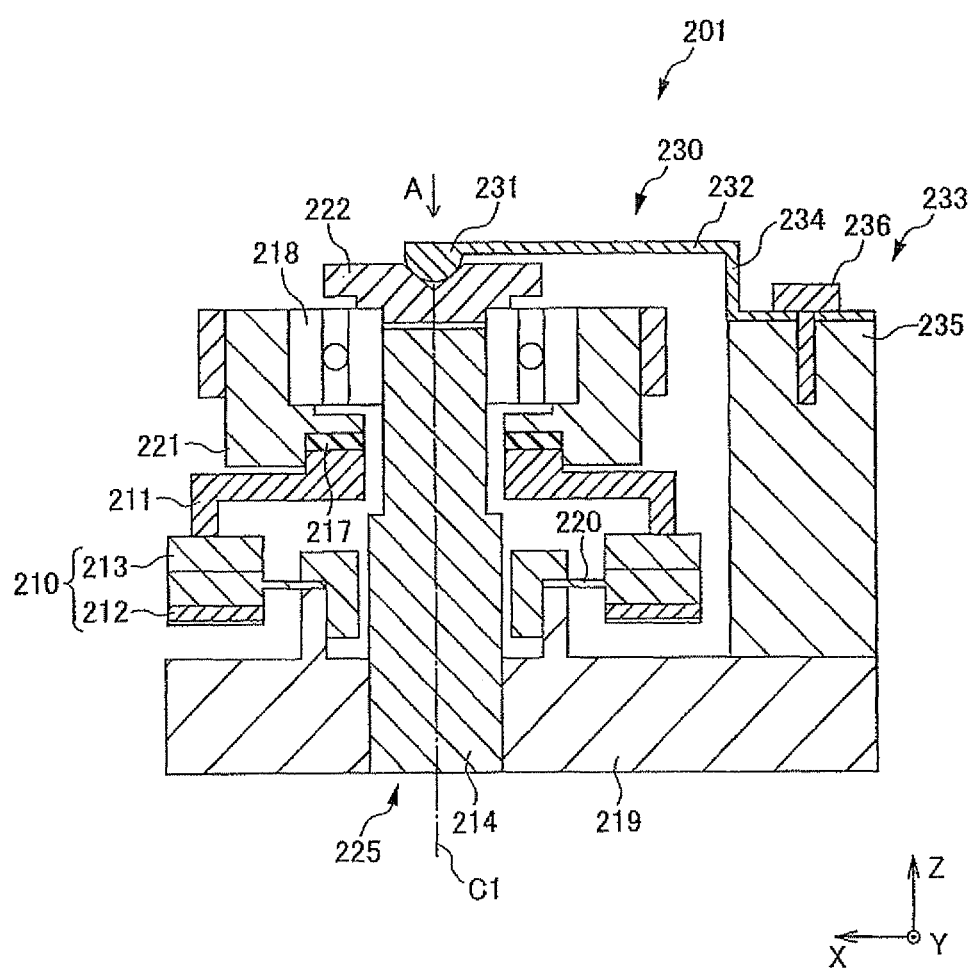
FIG. 6 is a drawing explaining a vibrational wave motor according to a second embodiment of the present invention.
Figure 7:
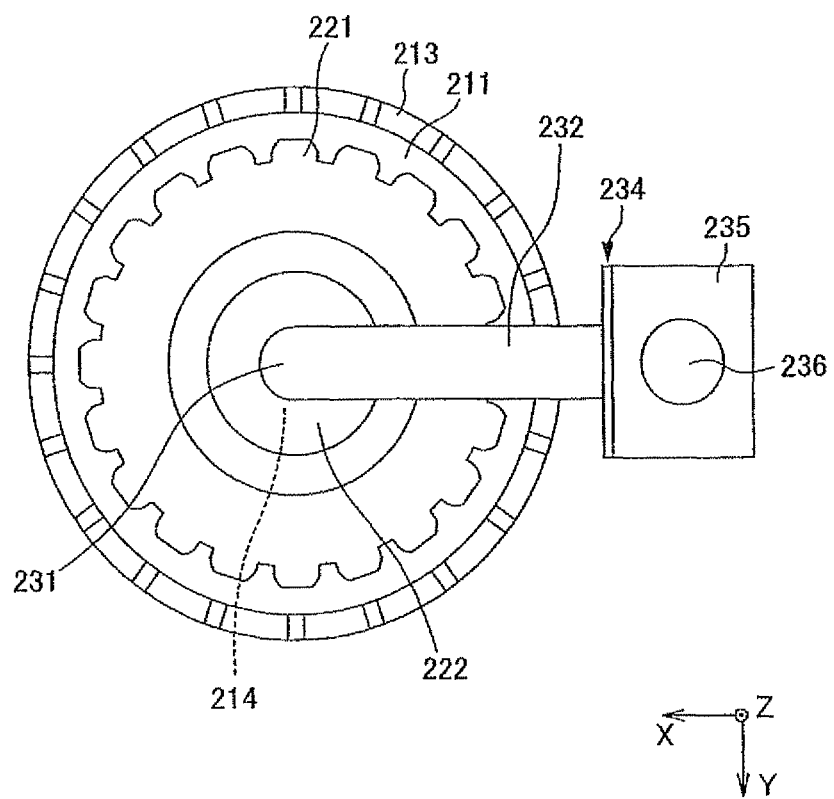
FIG. 7 is a drawing seen from a direction A of FIG. 6.
Figure 8:
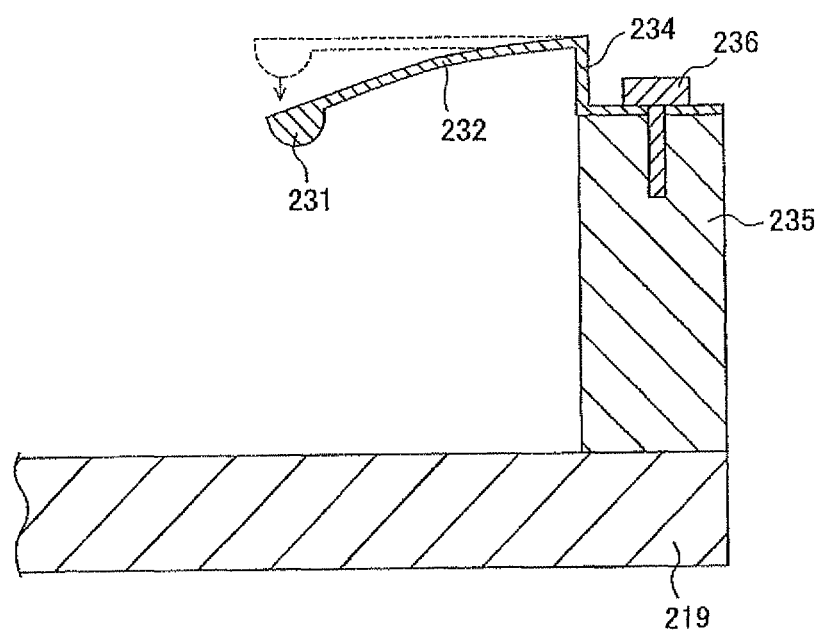
FIG. 8 is a drawing showing a state where a pressure applying portion is not pressing a pressure receiving member in the second embodiment.

Next, a second embodiment is explained. FIG. 6 is a drawing explaining a vibrational wave motor 201 according to the second embodiment of the invention. FIG. 7 is a drawing seen from an A direction of FIG. 6. FIG. 8 is a drawing showing a state where a pressure applying portion 231 is not pressing a pressure receiving member 222.

The second embodiment is provided with a motor unit 225 disposed centered about a fixed shaft 214, about which a moving element 211 rotates; and a pressing member 230. The explanation of an oscillator 210 of the motor unit 225 is omitted because it has the same constitution as the first embodiment.

The moving element 211 is fixed to a gear member 221 via a rubber member 217. The rubber member 217 joins the moving element 211 and the gear member 221 through its adhesiveness, and absorbs vibrations applied by the moving element 211 to prevent the vibrations from being transmitted to the gear member 221. It may be preferable but not necessary to use a butylene rubber or the like as its material.

A bearing 218 is disposed diametrically inside the gear member 221. The fixed shaft 214 is fit diametrically inside this bearing 218. The moving element 211 is rotationally driven about a shaft center C1 of the fixed shaft 214. The fixed shaft 214 is fixed to a base plate 219.

On the other hand, a pressure receiving member 222 is disposed diametrically inside the bearing 218, and its shaft center is disposed concentrically with the shaft center C1 of the fixed shaft 214.

A fin portion 220 provided at the oscillator 210, and the fixed shaft 214 is fixed to the base plate 219. The pressing member 230 is disposed at the base plate 219.

The pressing member 230 is constituted of a pressure applying portion 231, a plate spring 232, a flange 234, and a fixing portion 235.

The plate spring 232 extends in a direction perpendicular to the shaft center C1 of the fixed shaft 214, and has the pressure applying portion 231 at its end. The pressing member 230, as shown in FIG. 8, has a curved form when in a state where it is not applying a pressing force. On the other hand, the pressing member 230 generates an appropriate pressing force when in the state of FIG. 6 where the pressure applying portion 231 engages with a conical indented portion of the pressure receiving member 222. Under this circumstance, the generated pressing force points along the shaft center direction of the fixed shaft 214.

At an end portion of the plate spring 232 opposite to the pressure applying portion 231, the flange 234 is formed. The flange 234, as shown in FIG. 7, has a width greater than the plate spring 232. As shown in FIG. 6, the flange 234 extends in a direction parallel to the shaft center C1 of the fixed shaft 214. In this constitution, the bending stiffness of the flange 234 is greater than the bending stiffness of the plate spring 232. Since there is little deformation in the flange 234 even when a pressing force is applied to the plate spring 232, the flange 234 functions as a fixed end. The flange 234 is attached by a screw 236 to the fixing portion 235 provided upright on the base plate 219.

According to the second embodiment, the flange 234 having a high bending stiffness is provided where the plate spring 232 is fixed to the fixing portion 235, and extends in the shaft center direction of the fixed shaft 214. According to the second embodiment, in the same way as the first embodiment, it is possible to securely apply the pressure of the pressure generating portion 233 of the pressing member 230 in the shaft center C1 direction of the fixed shaft 214, preventing an offset in the pressing force of the oscillator 210 and the moving element 211.

Since the pressing member 230 configured in such a manner allows the components other than the plate spring 232 to be geometrically lower than the plate spring 232, it is possible to decrease the height of the vibrational wave motor 201 (decreasing the width in the fixed shaft 214 direction). Further, even if the vibrational wave motor 201 is made flat, it is possible to achieve high rotational driving, high efficiency, and high load driving.

Further, it is possible to reduce the number of parts compared to the first embodiment. Accordingly, it is possible to reduce the number of manufacturing steps.

Third Embodiment

Figure 9:
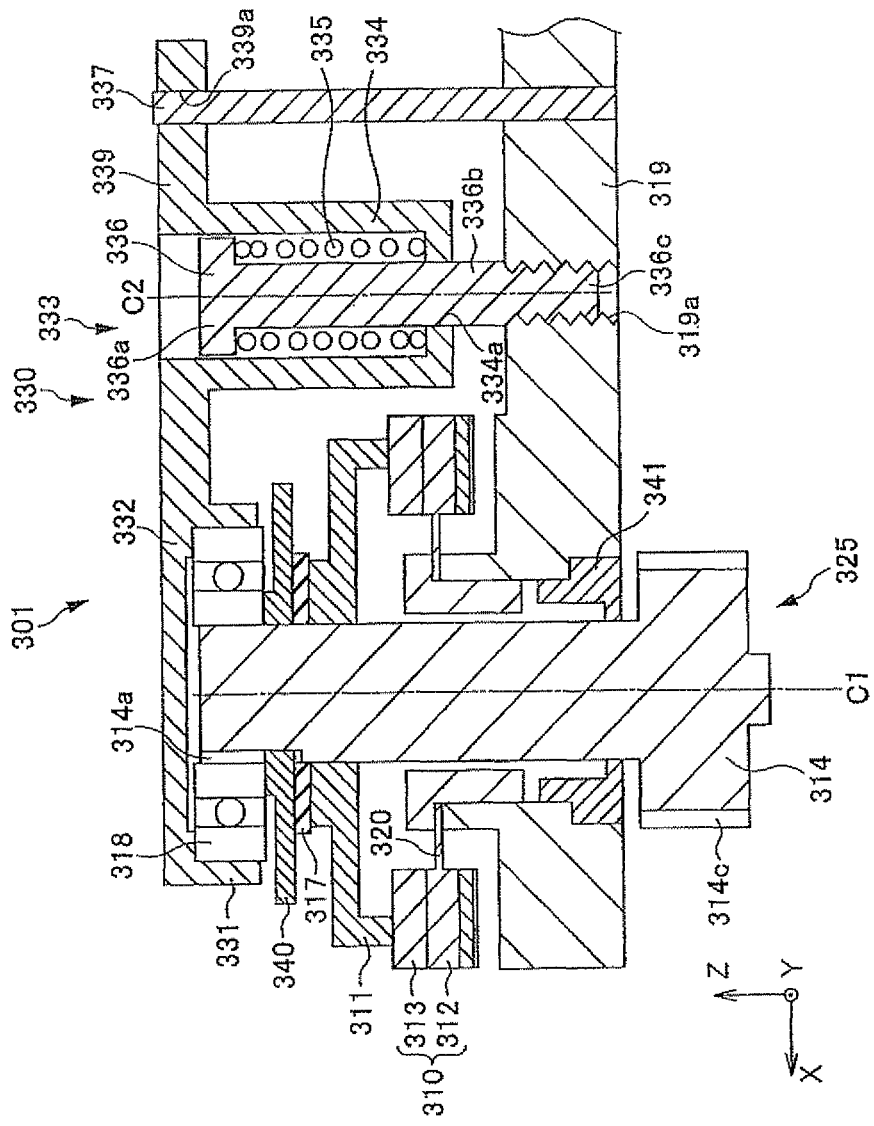
FIG. 9 is a drawing explaining a vibrational wave motor of a third embodiment.

Next, a third embodiment will be explained. FIG. 9 is a drawing explaining a vibrational wave motor 301 of the third embodiment of the present invention. The third embodiment provides a motor unit 325 and a pressing member 330 in the same way as the first embodiment. What differs from the first embodiment is the position of a bearing 318.

An oscillator 310 has the same constitution as the first embodiment, and its explanation is omitted.

A moving element 311 is connected with a bearing receiving member 340 via a rubber member 317. The rubber member 317 joins the moving element 311 and the bearing receiving member 340 through its adhesiveness. The rubber member 317 absorbs vibrations applied by the moving element 311 to prevent the vibrations from being transmitted to an output shaft 314. It may be preferable but not necessary that the rubber member 317 uses butyl rubber or the like as its material.

The bearing receiving portion 340 is formed such that it fits in a D cut 314a of the output shaft 314, and rotates integrally with the moving element 311. Namely, a shaft center of a rotation direction of the moving element 311 is substantially coaxial with a shaft center C1 of the output shaft 314.

The output shaft 314 is integrally provided with a gear portion 314c. Further, a bushing 341 is disposed at a base plate 319 in the vicinity of the gear portion 314c so that vibrations of the gear portion 314c are reduced. The output shaft 314 is inserted at an inner peripheral face of the bearing 318, and an extension portion 332 of the pressing member 330 is inserted at an outer peripheral face thereof.

At the base plate 319, a fin portion 320 provided at the oscillator 310 is fixed, the bushing 341 which prevents the vibrations of the output shaft 314 is inserted, and further, the pressing member 330 is fixed.

The pressing member 330 is provided with the extension portion 332 and a pressure generating portion 333.

The pressure generating portion 333 is provided with a cylinder portion 334, a compression spring 335, a pin 336, and a fixing pin 337.

In the same way as the first embodiment, inside the cylinder portion 334, the pin 336 is disposed, around which the compression spring 335 is inserted. A screw portion 336c of the pin 336 is screwed into a hole 319a of the base plate 319 via a hole 334a provided at the lower portion of the cylinder 334. In this manner, the compression spring 335 presses the cylinder portion 334 downward (Z minus direction) in FIG. 9. This pressing force is transmitted to a pressure applying portion 331 in contact with an outer periphery of the bearing 318 via the extension portion 332, so that a pressing force is applied to the bearing 318. Accordingly, the bearing 318 applies a pressing force to the output shaft 314, generating a pressing force between the oscillator 310 and the moving element 311.

A shaft center C2 of the pin 336 in the third embodiment extends in a direction parallel to a shaft center C1 of the output shaft 314. Since the inner face of the cylinder portion 334 is in contact with the outer periphery of a head portion 336a of the pin 336, and the inner face of the hole 334a provided at the lower portion of the cylinder portion 334 is in sliding contact with the outer periphery of a columnar portion 336b of the pin 336, the moving direction of the cylinder portion 334 is also in a direction parallel to the shaft center C1 of the output shaft 314. Accordingly, the pressing direction of the pressure applying portion 331 provided at the end of the extension portion 332 is substantially the same as the shaft center direction of the output shaft 314.

Further, at an upper end of the cylinder 334 of the third embodiment, another extension portion 339 extends in a direction opposite to the direction of extension of the extension portion 332 across the shaft center C2. A hole 339a is provided at the other extension portion 339. On the other hand, at the base plate 319, the fixing pin 337 is provided upright parallel to the shaft centers C1 and C2. Further, the fixing pin 337 is inserted into the hole 339a and in sliding contact with the inner peripheral face of the hole 339a.

According to the third embodiment, in addition to the guiding of the cylinder portion 334 by the pin 336, the other extension portion 339 extending from the cylinder portion 334 is further guided by the fixing pin 337 provided at the base plate 319. Accordingly, it is possible to more securely carry out parallel motion with respect to the shaft center C1 of the extension portion 332. Further, it is possible to prevent the movement of the pressing member 330 in a direction perpendicular to the shaft center C1.

In the third embodiment, it is possible to securely apply the pressing force generated by the pressure generating portion 333 of the pressing member 330 in the shaft center C1 direction of the output shaft 314, preventing an offset in the pressing force of the oscillator 310 and the moving element 311. Further, even if the motor unit 325 is made flat in this way, it is possible to achieve high rotation driving, high efficiency, and high load driving.

Moreover, as a result of changing the position of the bearing 318 of the third embodiment with respect to the first embodiment, it is possible to reduce the number of parts such as a stopper and the like.

Fourth Embodiment

Figure 10:
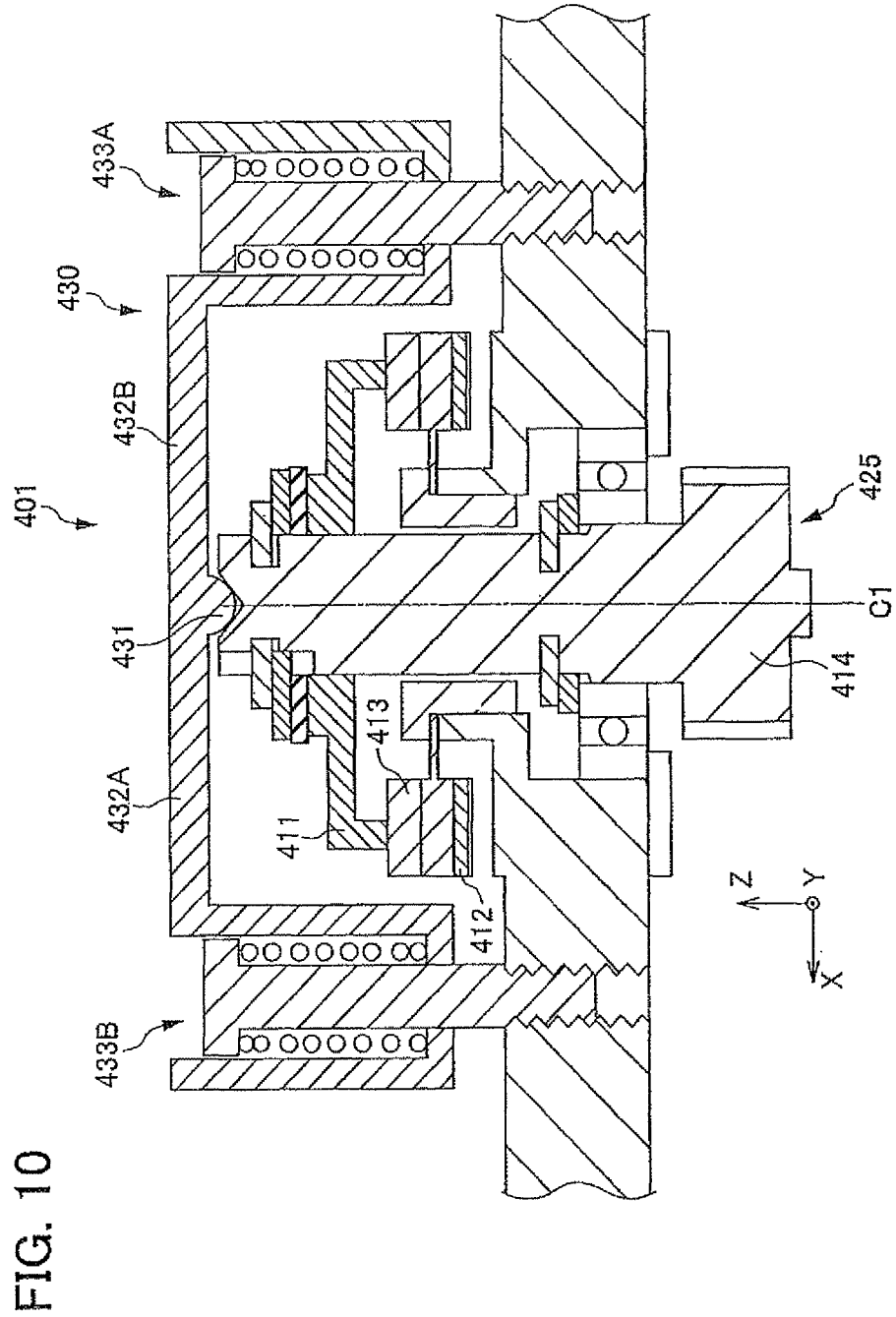
FIG. 10 is a drawing explaining a vibrational wave motor of a fourth embodiment.

FIG. 10 is a drawing explaining a vibrational wave motor 401 of a fourth embodiment of the present invention. The fourth embodiment differs from the first embodiment in the point that two of pressing members are provided.

Since a motor unit 425 is disposed between two pressing members 430A and 430B, it is possible to more securely apply a pressing force of the pressing members 430A and 430B in a shaft center C1 direction of an output shaft 414.

Fifth Embodiment

Figure 11:
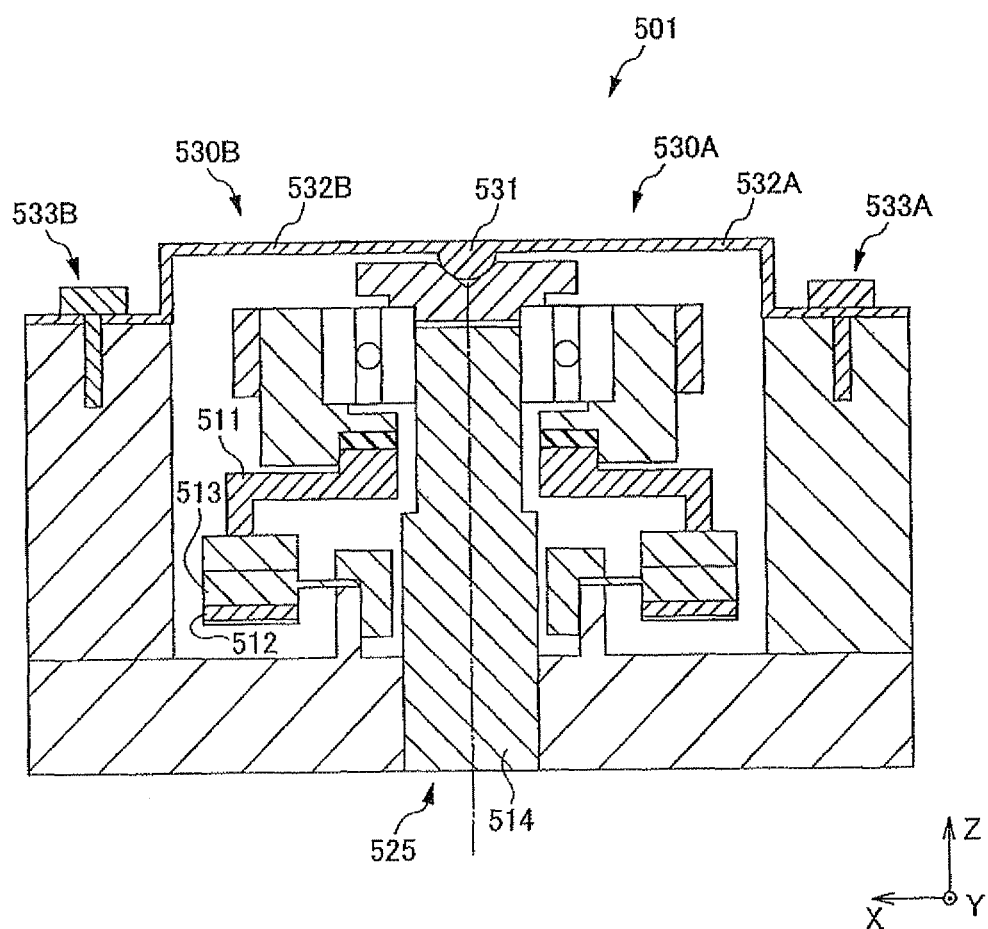
FIG. 11 is a drawing explaining a vibrational wave motor of a fifth embodiment of the present invention.
Figure 12:
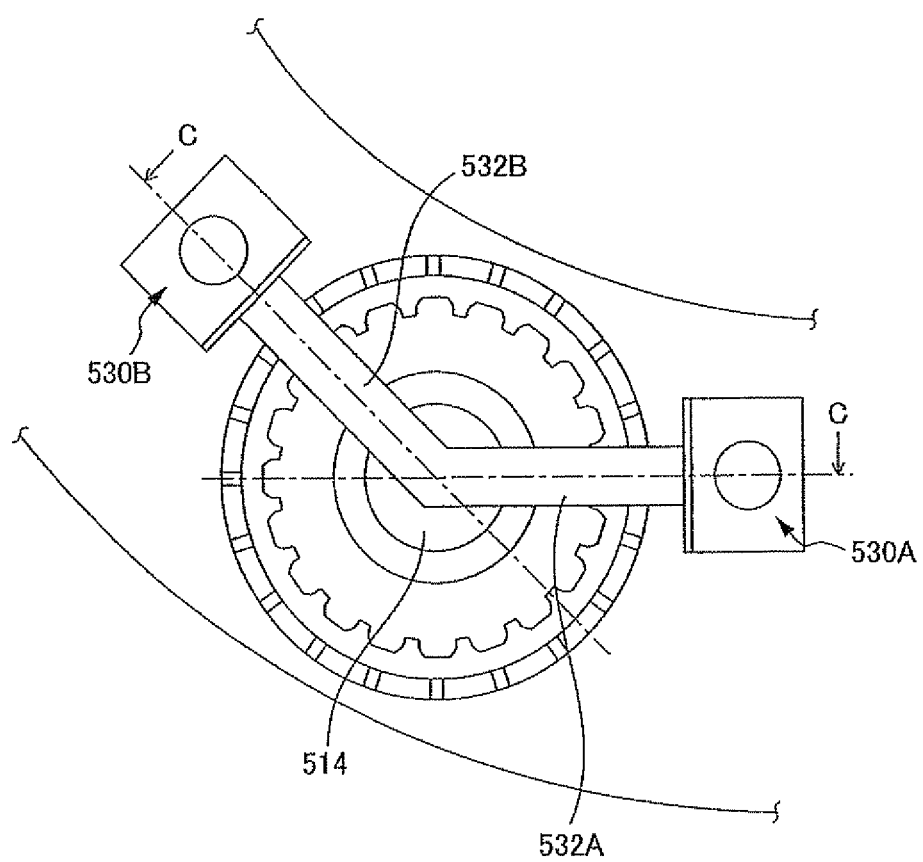
FIG. 12 is a drawing explaining the vibrational wave motor of the fifth embodiment of the present invention.

FIG. 11 and FIG. 12 are drawings explaining a vibrational wave motor 501 of a fifth embodiment of the present invention. FIG. 11 is a cross sectional view along C-C of FIG. 12.

The fifth embodiment is the same as the second embodiment, except for the point that two pressing members are provided. Further, a motor unit 525 is disposed between two pressing members, first and second pressing members 530A and 530B. In this way, it is possible to securely apply a pressing force of the first and second pressing members 530A and 530B in a shaft direction of an output shaft 514.

Further, in the fifth embodiment, as shown in FIG. 12, an extension portion 532A of the first pressing member 530A and an extension portion 532B of the second pressing member 530B are provided so that they are not on the same diameter (the same straight line). Namely, the angle formed between the extension portion 532A and the extension portion 532B extending from a shaft center C1 of the output shaft 514 is less than 180°.

In this way, it is possible to dispose the vibrational wave motor 501 in an arc-shaped space such as an empty space between tube members of a lens barrel 2.

Modifications

Without being limited to the above explained embodiments, various modifications and variations are possible, and these are also included in the scope of the present invention. Further, the above described embodiments may also be used in appropriate combinations, but detailed explanations are omitted. Further, the present invention is not limited by the above explained embodiments.

What is claimed is:

1. A vibrational wave motor comprising:
a motor main body; and
a pressing member,
wherein the motor main body comprises:
an electromechanical conversion element configured to be excited by a driving signal;
an elastic body configured to be joined to the electromechanical conversion element and generate an oscillating wave by an excitation thereof; and
a relative motion member configured to be in pressure contact with the elastic body and rotationally driven relatively with respect to the elastic body by the oscillating wave,
wherein the pressing member is configured to generate a pressing force between the elastic body and the relative motion member, and
wherein the pressing member comprises:
a pressure applying portion configured to press one of the elastic body and the relative motion member towards the other, along a rotation axis of rotational driving;
an extension portion configured to extend from the pressure applying portion towards an outer side in a radial direction centered about the rotation axis; and
a pressing main body disposed further to the outer side in the radial direction than the motor main body at the extension portion,
wherein the pressing main body includes a pressed portion configured to be continuous from the extension portion and pressed along an axis parallel to the rotation axis, and
wherein the pressed portion is configured to be pressed by a compression spring.

2. A lens barrel provided with the vibrational wave motor according to claim 1.

3. A camera provided with the vibrational wave motor according to claim 1.

4. A vibrational wave motor comprising:
a motor main body; and
a pressing member,
wherein the motor main body comprises:
an electromechanical conversion element configured to be excited by a driving signal;
an elastic body configured to be joined to the electromechanical conversion element and generate an oscillating wave by an excitation thereof; and
a relative motion member configured to be in pressure contact with the elastic body and rotationally driven relatively with respect to the elastic body by the oscillating wave,
wherein the pressing member is configured to generate a pressing force between the elastic body and the relative motion member, and
wherein the pressing member comprises:
a pressure applying portion configured to press one of the elastic body and the relative motion member towards the other, along a rotation axis of rotational driving;
an extension portion configured to extend from the pressure applying portion towards an outer side in a radial direction centered about the rotation axis; and
a pressing main body disposed further to the outer side in the radial direction than the motor main body at the extension portion, wherein
the extension portion is configured to extend in a plurality of radial directions from the pressure applying portion, and the pressing main body is provided at respective ends of the extension portion.

5. The vibrational wave motor according to claim 4, wherein
the plurality of radial directions is configured to extend in different diametric directions.

6. A lens barrel provided with the vibrational wave motor according to claim 4.

7. A camera provided with the vibrational wave motor according to claim 4.

8. A vibrational wave motor comprising:
a motor main body; and
a pressing member,
wherein the motor main body comprises:
an electromechanical conversion element configured to be excited by a driving signal;
an elastic body configured to be joined to the electromechanical conversion element and generate an oscillating wave by an excitation thereof; and
a relative motion member configured to be in pressure contact with the elastic body and rotationally driven relatively with respect to the elastic body by the oscillating wave,
wherein the pressing member is configured to generate a pressing force between the elastic body and the relative motion member, and
wherein the pressing member comprises:
a pressure applying portion configured to press one of the elastic body and the relative motion member towards the other, along a rotation axis of rotational driving;
an extension portion configured to extend from the pressure applying portion towards an outer side in a radial direction centered about the rotation axis; and
a pressing main body disposed further to the outer side in the radial direction than the motor main body at the extension portion,
wherein the extension portion comprises a plate spring, wherein
the extension portion comprises a first portion and a second portion,
an end at the outer side in the radial direction of the first portion is configured to be continuous with the second portion extending parallel to the rotation axis, and
a stiffness of the second portion is higher than a stiffness of the first portion.

9. A lens barrel provided with the vibrational wave motor according to claim 8.

10. A camera provided with the vibrational wave motor according to claim 8.

* * * * *